(12) United States Patent
Takahashi

(10) Patent No.: US 7,436,453 B2
(45) Date of Patent: Oct. 14, 2008

(54) ELECTRONIC APPARATUS AND CAMERA HAVING CONNECTORS

(75) Inventor: Tomoki Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 10/921,562

(22) Filed: Aug. 19, 2004

(65) Prior Publication Data
US 2005/0054227 A1    Mar. 10, 2005

(30) Foreign Application Priority Data
Aug. 20, 2003   (JP)   ............... 2003-296188

(51) Int. Cl.
*H04N 5/225* (2006.01)

(52) U.S. Cl. .................... 348/374; 348/207.1

(58) Field of Classification Search ......... 348/372–375, 348/207.1, 207.2
See application file for complete search history.

(56) References Cited

U.S. PATENT DOCUMENTS

| | | | | |
|---|---|---|---|---|
| 5,982,626 A * | 11/1999 | Kodama | ............ | 361/749 |
| 6,781,629 B2 * | 8/2004 | Ohnogi | ............ | 348/333.01 |
| 6,950,142 B2 * | 9/2005 | Soumi et al. | ............ | 348/375 |
| 2001/0017664 A1 * | 8/2001 | Misawa | ............ | 348/373 |
| 2002/0079864 A1 | 6/2002 | Soumi et al. | ............ | 320/115 |
| 2002/0097323 A1 * | 7/2002 | Ito | ............ | 348/207 |
| 2002/0186315 A1 * | 12/2002 | Yoshida et al. | ............ | 348/371 |
| 2004/0223080 A1 * | 11/2004 | Kim | ............ | 348/375 |

FOREIGN PATENT DOCUMENTS

| | | |
|---|---|---|
| CN | 1360223 A | 7/2002 |
| EP | 1 220 535 A2 | 7/2002 |
| JP | 08-279940 | 10/1996 |
| JP | 2000-208952 | 7/2000 |

* cited by examiner

*Primary Examiner*—Lin Ye
*Assistant Examiner*—Gevell Selby
(74) *Attorney, Agent, or Firm*—Cowan, Liebowitz & Latman, P.C.

(57) ABSTRACT

An electronic apparatus is disclosed which is structured so that a plurality of connectors can be arranged efficiently while plugs are allowed to be connected easily thereto. The electronic apparatus comprises a first connector having a connection port on a first face of the body of the apparatus, and a second connector having a connection port on a second face, adjacent to the first face, of the body of the apparatus, and a single circuit board, accommodated inside the body. In addition, the first connector is disposed in an area between the first face and the second connector.

2 Claims, 13 Drawing Sheets

ELECTRONIC APPARATUS AND CAMERA HAVING CONNECTORS

BACKGROUND OF THE INVENTION

1. Field of the Invention

The present invention relates to an electronic apparatus having a plurality of connectors.

2. Description of Related Art

To electronic apparatuses, other electronic apparatuses, external power supplies, etc., can be connected via various interfaces. For example, to image pickup apparatuses, such as digital still cameras and camcorders, personal computers, printers, converters for converting AC power to DC power, etc., can be connected via various interfaces. For this purpose, electronic apparatuses are each provided with a plurality of connectors conforming to these interfaces and having different shapes.

In the case where connectors are provided for an electronic apparatus, connector covers for covering unused connectors are detachably provided so as not to impair the appearance of the apparatus, and to prevent foreign matters from getting into the body of the apparatus and to protect the contacts of the connectors.

Electronic apparatuses being frequently carried, such as image pickup apparatuses, have recently undergone progressive miniaturization, making it necessary to efficiently arrange the connectors. In addition, it is necessary that connectors should be arranged at positions not interfering with the use of the apparatus when it is used.

FIG. 13 and FIG. 14 show an example wherein a plurality of connectors are arranged at the lower portion on one side of a conventional image pickup apparatus 100. FIG. 13 shows a state wherein a connector cover 101 is closed, and FIG. 14 shows a state wherein the connector cover 101 is open.

This image pickup apparatus 100 is provided with three connectors, that is, a DC power input connector 102, a video/audio output connector 103 and a USB connector 104. The connector cover 101 is held so as not to drop from the body of the apparatus in both cases when the connector cover 101 is open and when it is closed.

Furthermore, the electronic apparatus proposed in Japanese Patent Application Laid-Open No. 2000-208952 is structured so that its connectors are all stored in a jack box and can be accommodated in the body of the apparatus. Hence, the plurality of the connectors can be arranged without impairing the appearance of the body of the apparatus.

However, the image pickup apparatus shown in FIG. 13 and FIG. 14 has an internal structure shown in FIG. 15. That is, the video/audio output connector 103 and the USB connector 104 are mounted on a connector-only circuit board (connector circuit board) 105, and only the DC power input connector 102 is disposed on a power supply circuit board 106. The connector circuit board 105 and the power supply circuit board 106 are electrically connected to each other by connecting an FFC (flexible flat cable) 109 to FFC connectors 107 and 108 provided on the respective circuit boards.

Since many components, such as the connector circuit board 105, the FFC connectors 107 and 108 and the FFC 109, are required, this structure is not suited for the miniaturization of the image pickup apparatus. In addition, this structure increases the number of components and worsens the workability of assembly, resulting in high cost.

Furthermore, the connector cover shown in FIG. 13 and FIG. 14 is used to open and close the connection ports of the above-mentioned three connectors all together. Hence, even in the case when one or two of these three connectors are used, the connection ports of all the connectors are exposed, thereby causing a problem of allowing foreign matters to get into the exposed connection ports.

In addition, the above-mentioned patent publication does not mention anything about efficient arrangement of a plurality of connectors. In reality, however, since connectors are required to be electrically connected inside, the connectors must be arranged on a circuit board in consideration of mounting efficiency. Furthermore, if the connectors are simply arranged close to one another on the circuit board, the plugs interfere with one another when the plugs are connected to the respective connectors. Hence, a certain amount of space is required between the connectors.

SUMMARY OF THE INVENTION

An object of the present invention is to provide an electronic apparatus being structured so that a plurality of connectors can be arranged efficiently while plugs are allowed to be connected easily thereto.

An electronic apparatus according to an aspect of the present invention comprises a first connector having a connection port on a first face of the body of the apparatus, and a second connector having a connection port on a second face, adjacent to the first face, of the body. In addition, the first connector is mounted in an area between the first face and the second connector.

The characteristics of the electronic apparatus according to the present invention will become apparent from the following explanation of a specific embodiment referring to the accompanying drawings.

DETAILED DESCRIPTION OF THE PREFERRED EMBODIMENTS

An embodiment of the present invention will be described below referring to the accompanying drawings.

Figure 5:
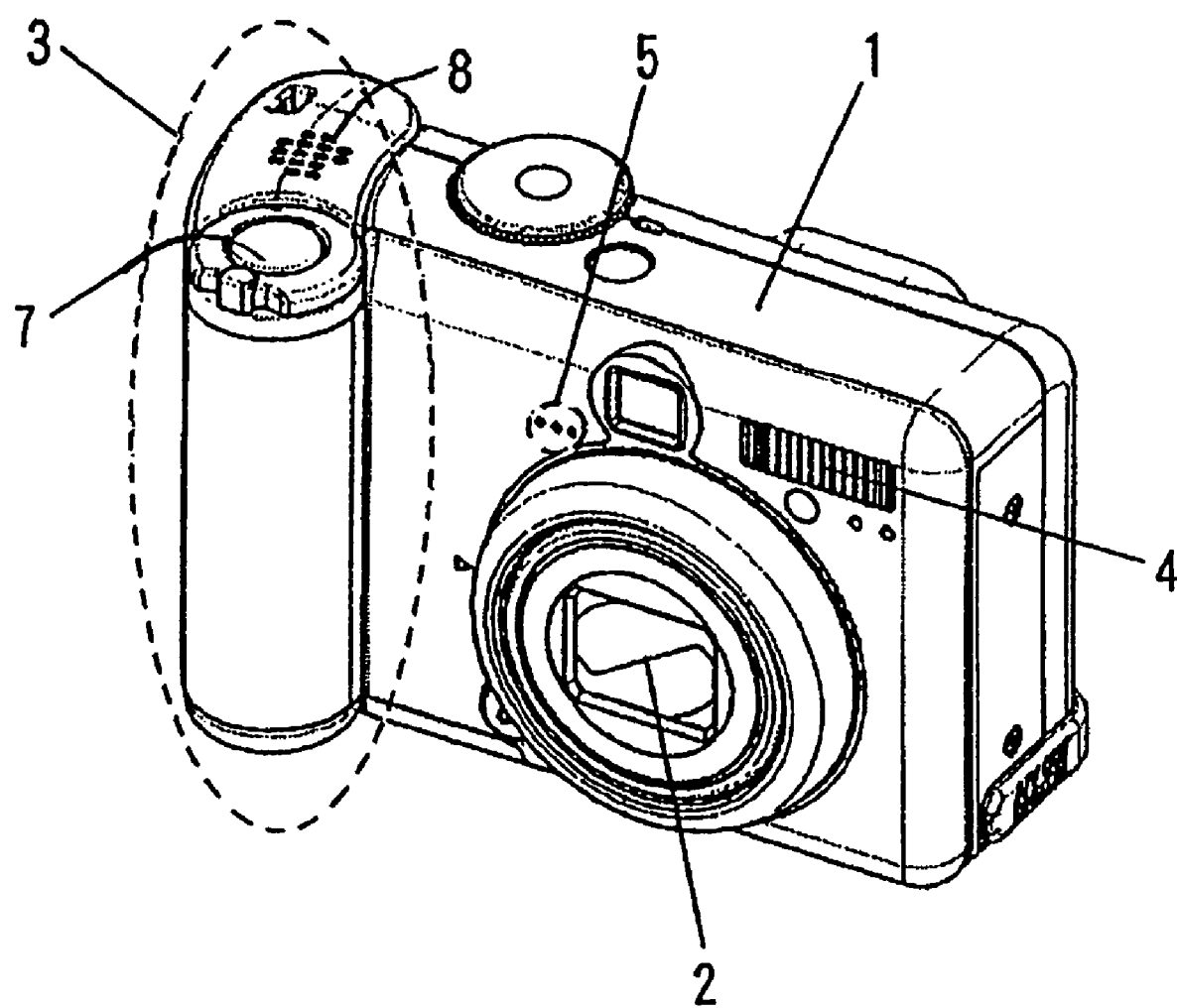
FIG. 5 is a front perspective view of the above-mentioned digital camera.
Figure 6:
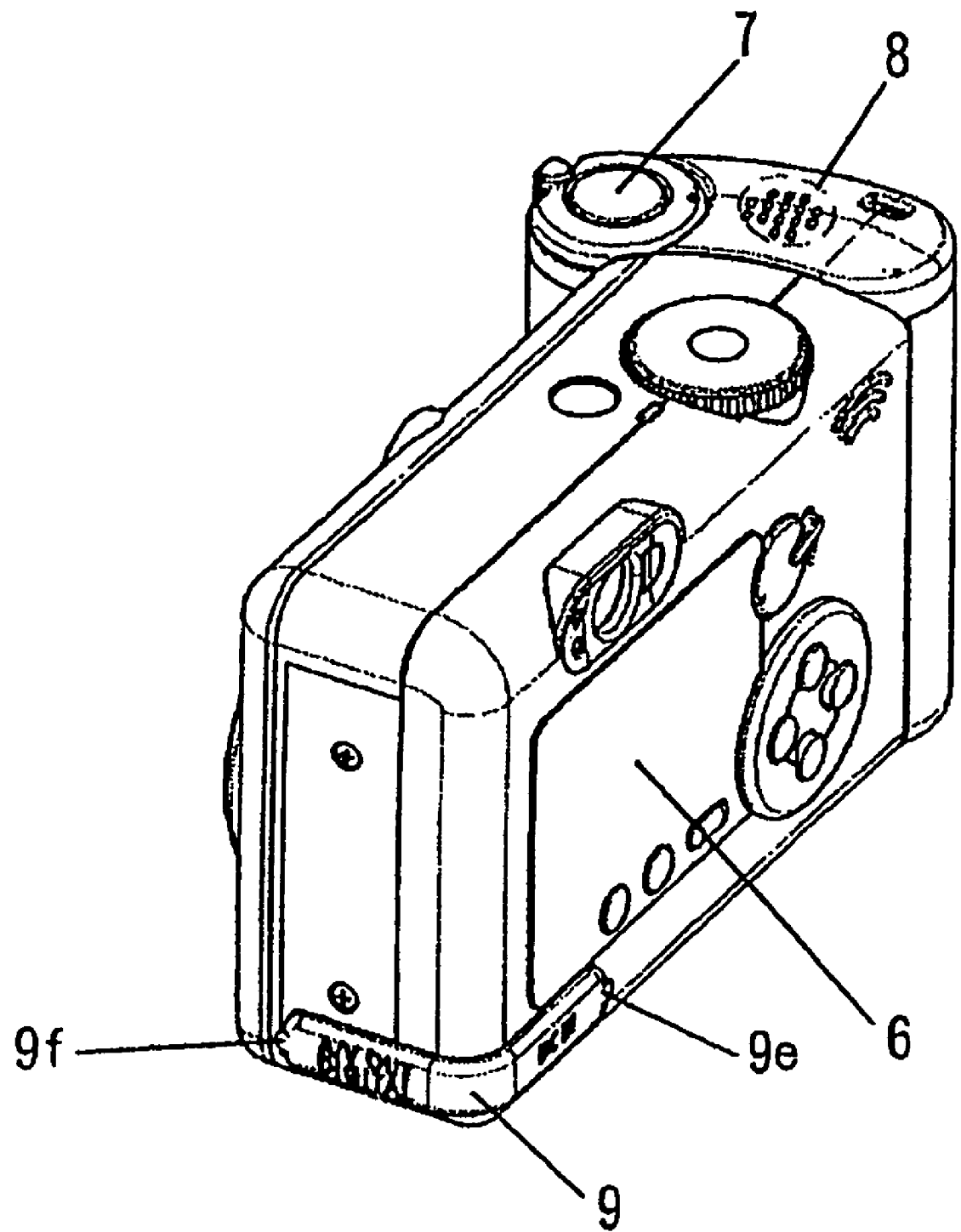
FIG. 6 is a rear perspective view of the above-mentioned digital camera.

First, FIG. 5 and FIG. 6 show the appearance of a digital camera (electronic apparatus) according to an embodiment of the present invention. In FIG. 5, Reference Numeral 1 denotes a camera body, and an image-taking lens 2 is provided on the front face thereof. In the state shown in FIG. 5, the image-taking lens 2 is collapsed inside the camera body 1. When the power switch (not shown) of the camera is turned on, the image-taking lens 2 protrudes forward from the camera body 1, and an image-taking becomes ready. When an image-taking switch 7 is turned on, an object image formed by the image-taking lens 2 is picked up by an image pickup device (CCD sensor, CMOS sensor, etc.,) (not shown), and the picked-up image is recorded on a recording medium, such as a semiconductor memory, loaded inside the camera body 1.

Reference Numeral 3 denotes a grip portion at which a user holds the camera body 1 with his or her right hand. The image-taking switch 7 is provided on the upper face of this grip portion 3.

Reference Numeral 4 denotes a flush light window, and Reference Numeral 5 denotes an audio input microphone. Audio data from the microphone 5 can be recorded on the above-mentioned recording medium together with image data. In addition, a sound reproduction speaker 8 is provided on the upper face of the camera body 1. Hence, sound stored on the recording medium can be reproduced, or operation sound and the like recorded beforehand on a memory (not shown) can be reproduced.

In FIG. 6, a liquid crystal display 6 is provided on the rear face of the camera body 1. Object images to be picked up and images having been picked up are displayed on this liquid crystal display 6.

In addition, a battery lid (not shown) that can be opened/closed with respect to the camera body 1 is provided on the bottom face of the camera body 1. After this battery lid is opened, a battery can be loaded inside the camera body 1.

Reference Numeral 9 denotes a connector cover (cover member) made of an elastic material as described later and installed so that it can be opened/closed with respect to the camera body 1. Reference Numerals 9e and 9f denote finger grip portions provided on both ends of the connector cover 9 to facilitate the opening operation of the connector cover 9. The connector cover 9 covers up three connectors described later. In addition, the connector cover 9 is provided at the left rear portion (and the lower portion) positioned diagonally to the grip portion 3 provided at the right front portion of the camera body 1. Since the connector cover 9 (in other words, the connectors) is disposed away from the grip portion 3 in this way, the connector cover 9 is kept out of the way during camera holding, and the operability of the camera can be improved.

Figure 7:
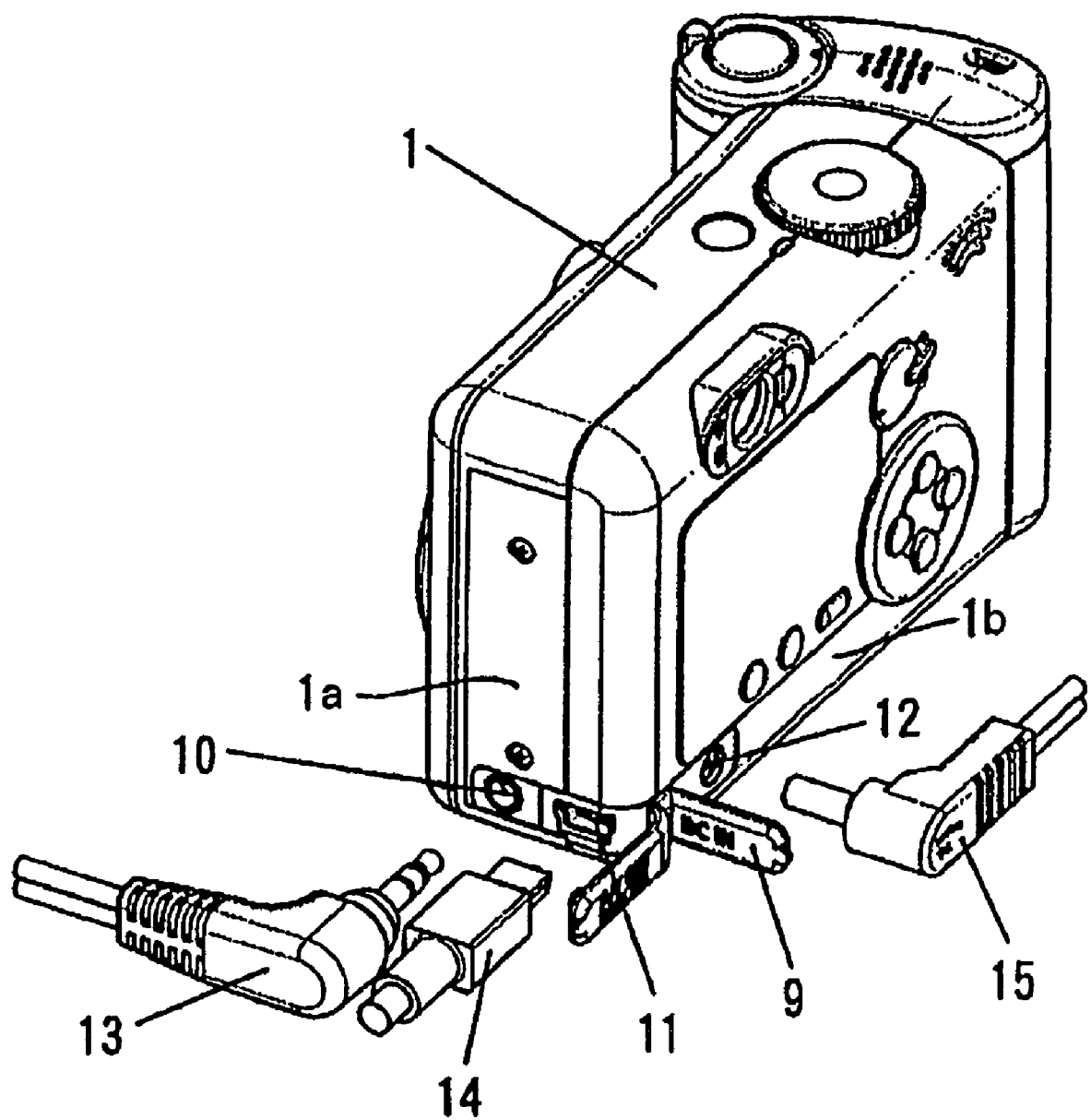
FIG. 7 is a rear perspective view of the above-mentioned digital camera (before plug insertion)
Figure 8:
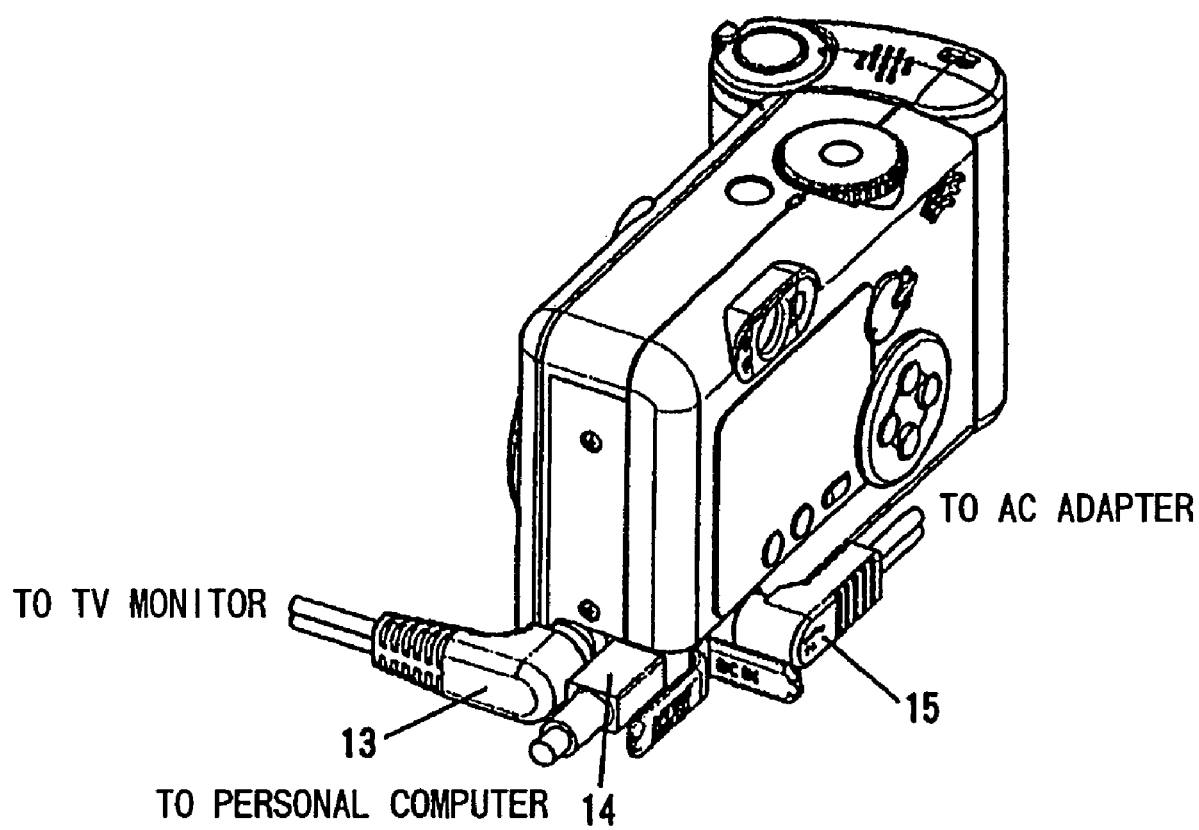
FIG. 8 is a rear perspective view of the above-mentioned digital camera (after plug insertion)

FIG. 7 and FIG. 8 show states wherein plugs are connected to the respective connectors exposed by the opening of the connector cover 9.

In the camera according to this embodiment, an audio/video output connector 10 and a USB connector 11 are disposed on a side face (first face) 1a of the camera body 1, and a DC input connector 12 is disposed on the rear face (second face) 1b adjacent to the side face 1a. Reference Numerals 13, 14 and 15 denote an audio/video output plug connected to the audio/video output connector 10, a USB plug connected to the USB connector 11 and a DC plug connected to the DC input connector 12, respectively.

A video/audio output apparatus (not shown), such as a TV monitor, is connected to the audio/video output plug 13. Video signals output from the image pickup device in the camera body 1 and audio/video signals from the recording medium are output to the video/audio output apparatus via the audio/video output connector 10 and the audio/video output plug 13. Hence, the video and audio signals obtained by the camera can be displayed and reproduced on the video/audio output apparatus serving as an external apparatus.

A personal computer (not shown) is connected to the USB plug 14. Hence, the personal computer can read video signals, audio signals and information related thereto, recorded on the recording medium inside the camera body 1, via the USB connector 11 and the USB plug 14. In addition, the personal computer can remote-control the camera.

An external power supply apparatus (AC adapter) (not shown) is connected to the DC plug 15. The external power supply apparatus converts an AC voltage to a DC voltage. The DC voltage is supplied to the camera body 1 via the DC plug 15 and the DC input connector 12.

Figure 9:
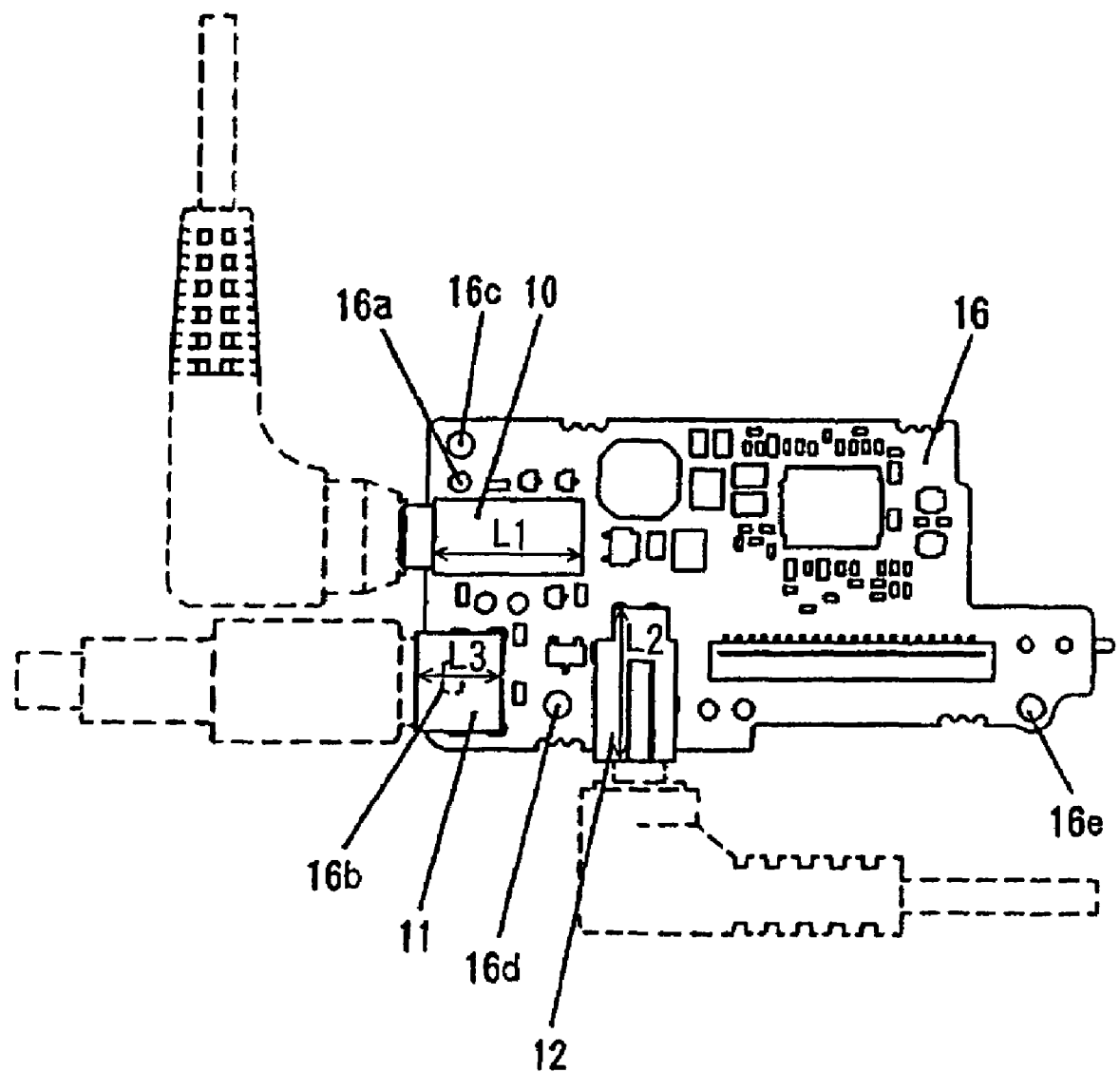
FIG. 9 is a plan view of the power supply circuit board of the above-mentioned digital camera.

Next, the structure of a power supply circuit board provided inside the camera body 1 according to this embodiment will be described referring to FIG. 9. In FIG. 9, Reference Numeral 16 denotes the power supply circuit board on which electrical circuits including a power supply circuit are mounted.

On the power supply circuit board 16, the audio/video output connector first connector) 10, the USB connector (third connector) 11 and the DC input connector (second connector) 12 are mounted (soldered). In comparison with the depth dimension L1 (in the direction of plug connection) of the audio/video output connector 10 and the depth dimension L2 of the DC input connector 12, the depth dimension L3 of the USB connector 11 is short. In this embodiment, by taking advantage of this dimensional difference, the USB connector 11 is disposed near a corner of the circuit board 16, and the audio/video output connector 10 and the DC input connector 12 are disposed so as to enclose the USB connector 11 in its two directions. This raises the mounting efficiency of the connectors and other electronic components on the power supply circuit board 16. In addition, the connectors are disposed so that plugs connected thereto do not interfere with one another.

Figure 1:
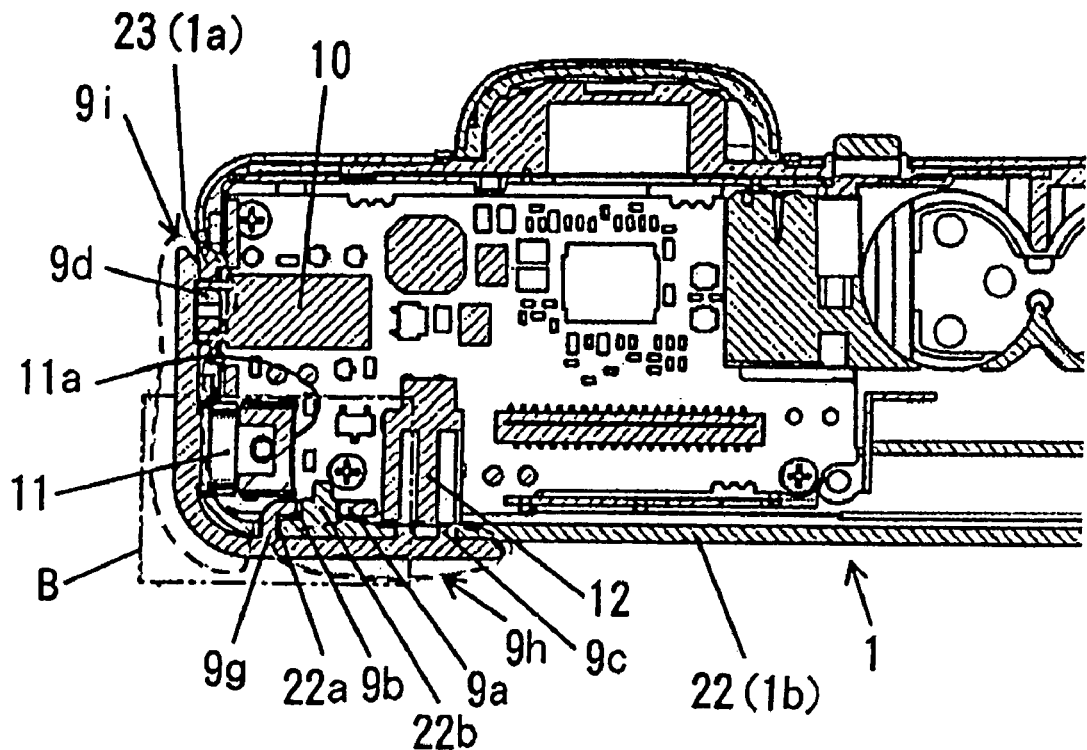
FIG. 1 is a cross-sectional view of a digital camera according to an embodiment of the present invention.

In the state shown in FIG. 1 wherein the circuit board 16 is built in the camera body 1, the USB connector 11 having a plug-connection port on the side face 1a of the camera body 1 is mounted on the circuit board 16 in an area between the side face 1a and the DC input connector 12 having a plug-connection port on the rear face 1b. The end face 11a of the USB connector 11 in its depth direction (plug connection direction) is opposed to a side face of the DC input connector 12. In addition, the USB connector 11 is disposed in an area enclosed by the DC input connector 12, the audio/video output connector 10 having a plug-connection port on the side face 1a, the side face 1a and the rear face 1b.

The length of the USB connector 11 in its plug connection direction is made shorter than that of the DC input connector 12. Hence, other electronic components and camera structural parts (for example, a structural part for installing the connector cover 9 described later to the camera body 1) can be disposed in a space between the end face 11a of the USB connector 11 in its plug connection direction and the side face of the DC input connector 12. This can raise the entire arrangement efficiency of the arrangement of the components including the other electronic components and structural parts.

As shown in FIG. 9, the circuit board 16 is provided with holes 16a and 16b serving as positioning portions with respect to a main chassis described later. The circuit board 16 is also provided with holes 16c, 16d and 16e through which the circuit board 16 is screwed to the main chassis. With these holes, the circuit board 16 can be secured to the main chassis at high positional accuracy. In addition, the screwing positions are disposed near the connectors, whereby the deformation of the circuit board 16 owing to a prying force caused when the plug connection and disconnection are performed can be minimized.

Figure 10:
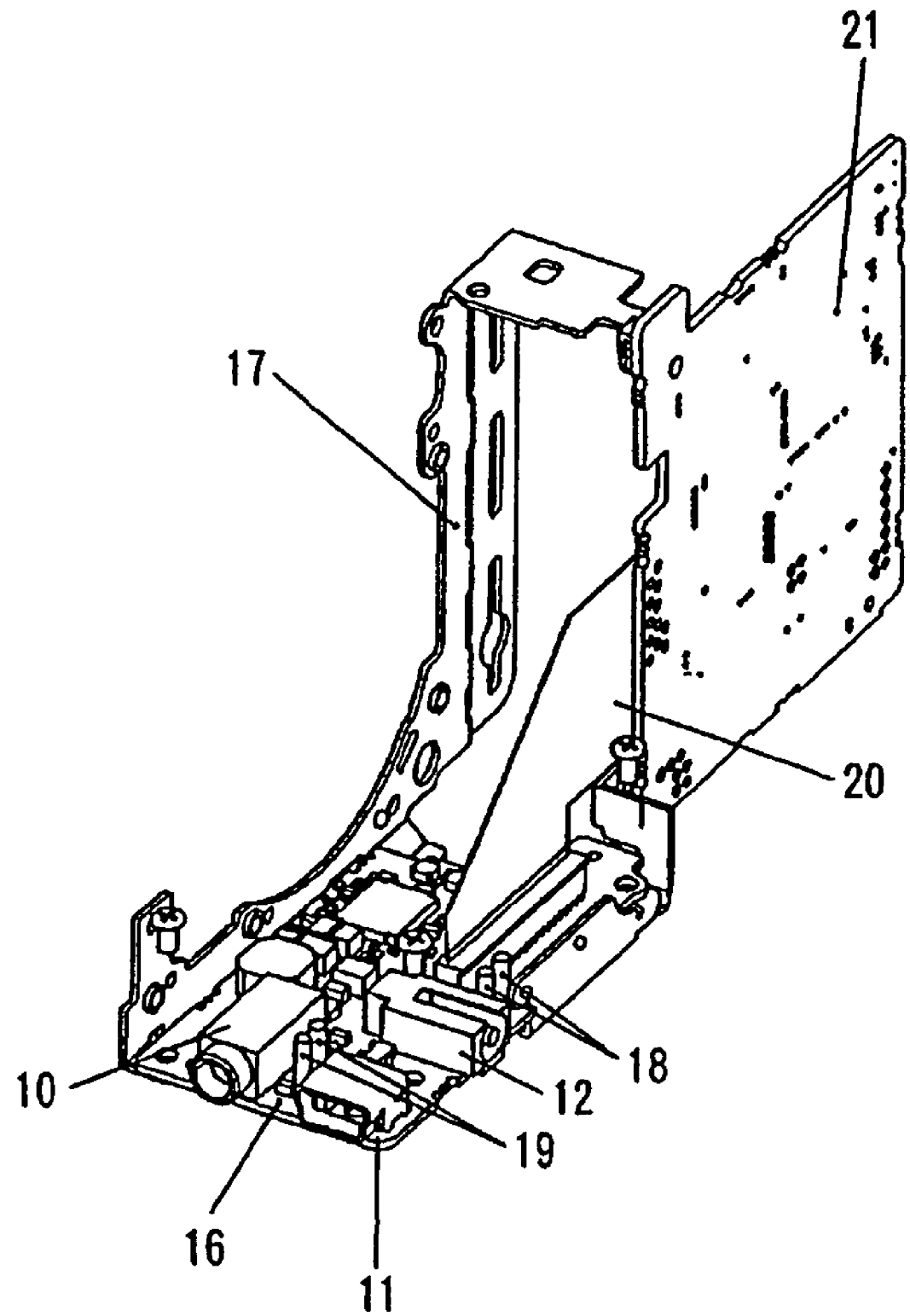
FIG. 10 is a rear perspective view of the main chassis of the above-mentioned digital camera.

In FIG. 10, Reference Numeral 17 denotes the main chassis serving as a main structural body of the camera body 1. The power supply circuit board 16 is screwed to the main chassis 17 at three positions. Reference Numeral 18 denotes a battery cable electrically connected to battery contacts provided in a battery accommodation compartment (not shown). Electric power is supplied from a battery inserted in the battery accommodation compartment to the power supply circuit board 16.

Reference Numeral 19 denotes a flush light power supply cable. This cable supplies electric power, transformed so as to have a predetermined voltage inside the power supply circuit board 16, to a flush light circuit board (not shown). In addition, the power supply circuit board 16 is connected via a flat cable 20 to a main circuit board 21 on which a controller (CPU) and the like for variously controlling the camera are mounted.

Next, the connector cover 9 will be described referring to FIG. 11 and FIG. 12 and FIG. 1 to FIG. 3.

Figure 11:
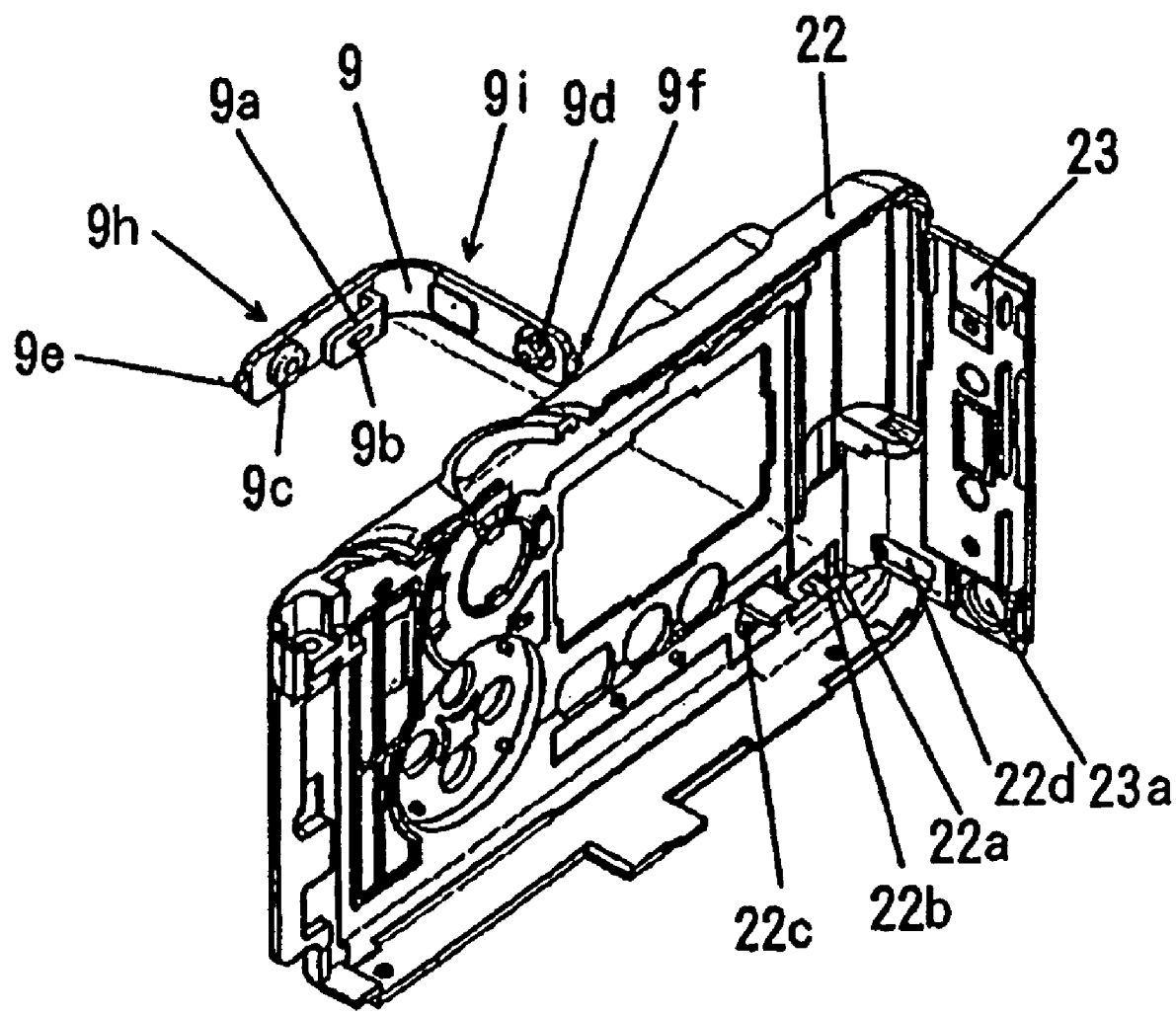
FIG. 11 is a perspective view of the rear and side covers of the above-mentioned digital camera (before connector cover installation)
Figure 12:
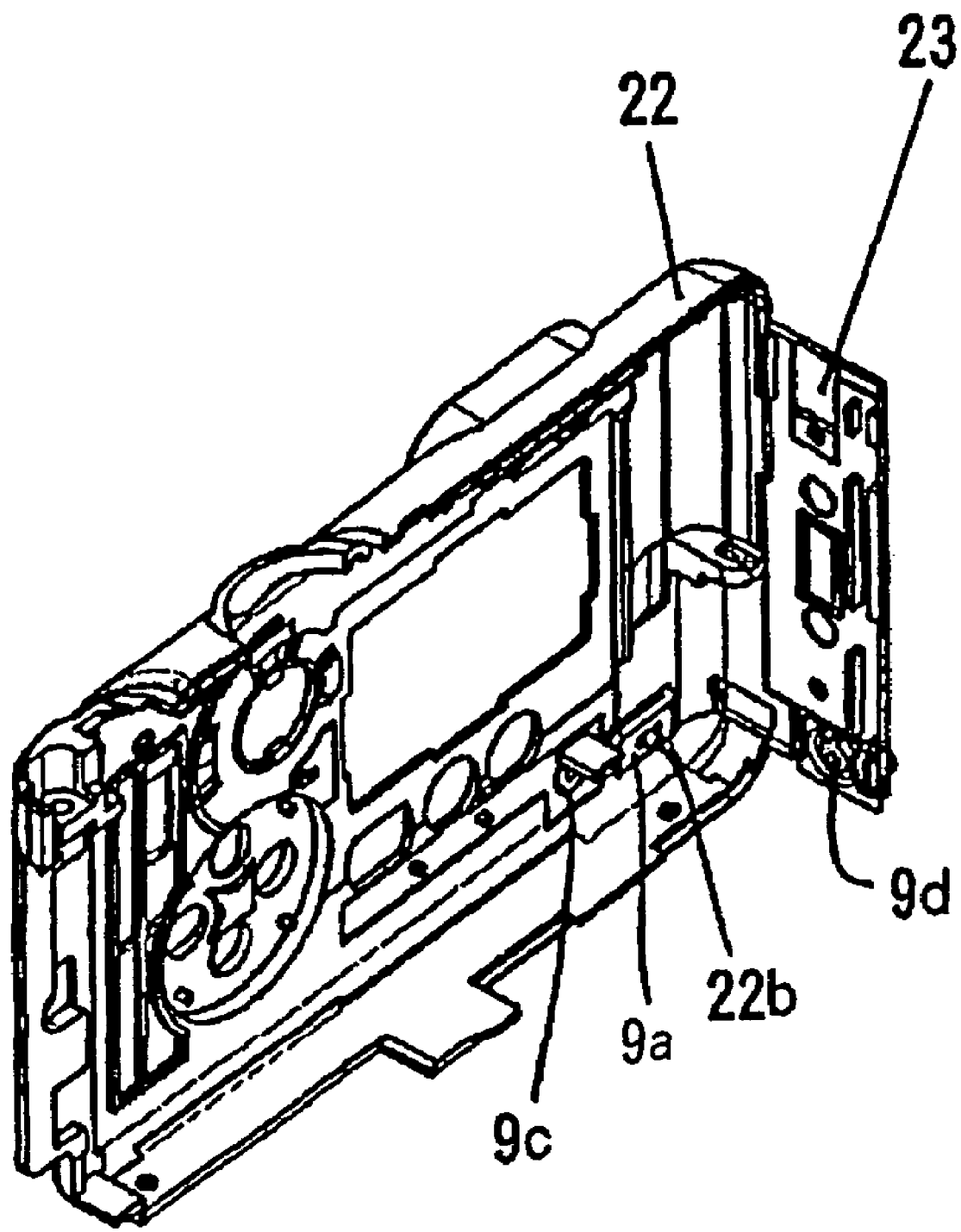
FIG. 12 is a perspective view of the rear and side covers of the above-mentioned digital camera (after connector cover installation)
Figure 13:
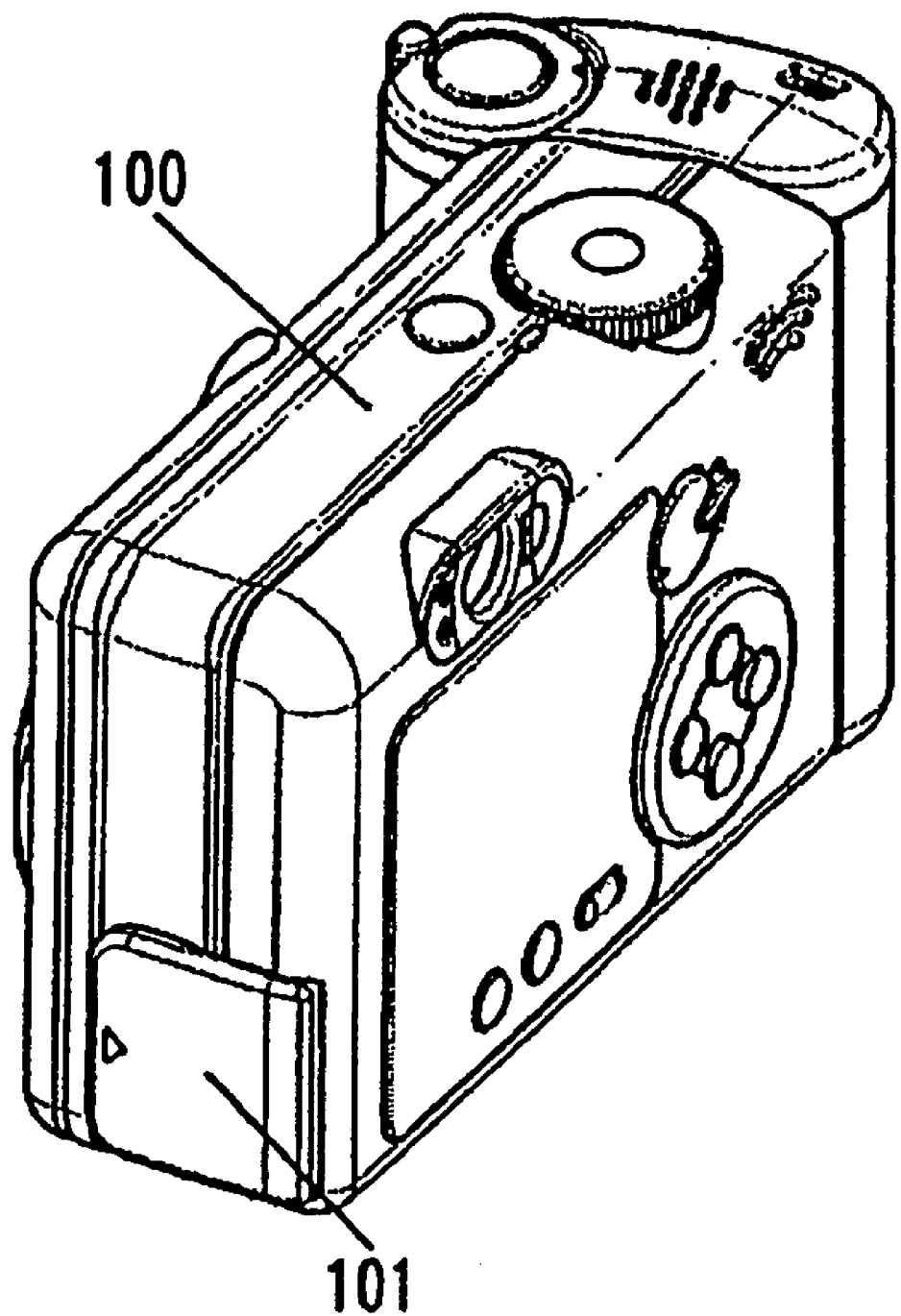
FIG. 13 is a rear perspective view of the conventional digital camera.
Figure 14:
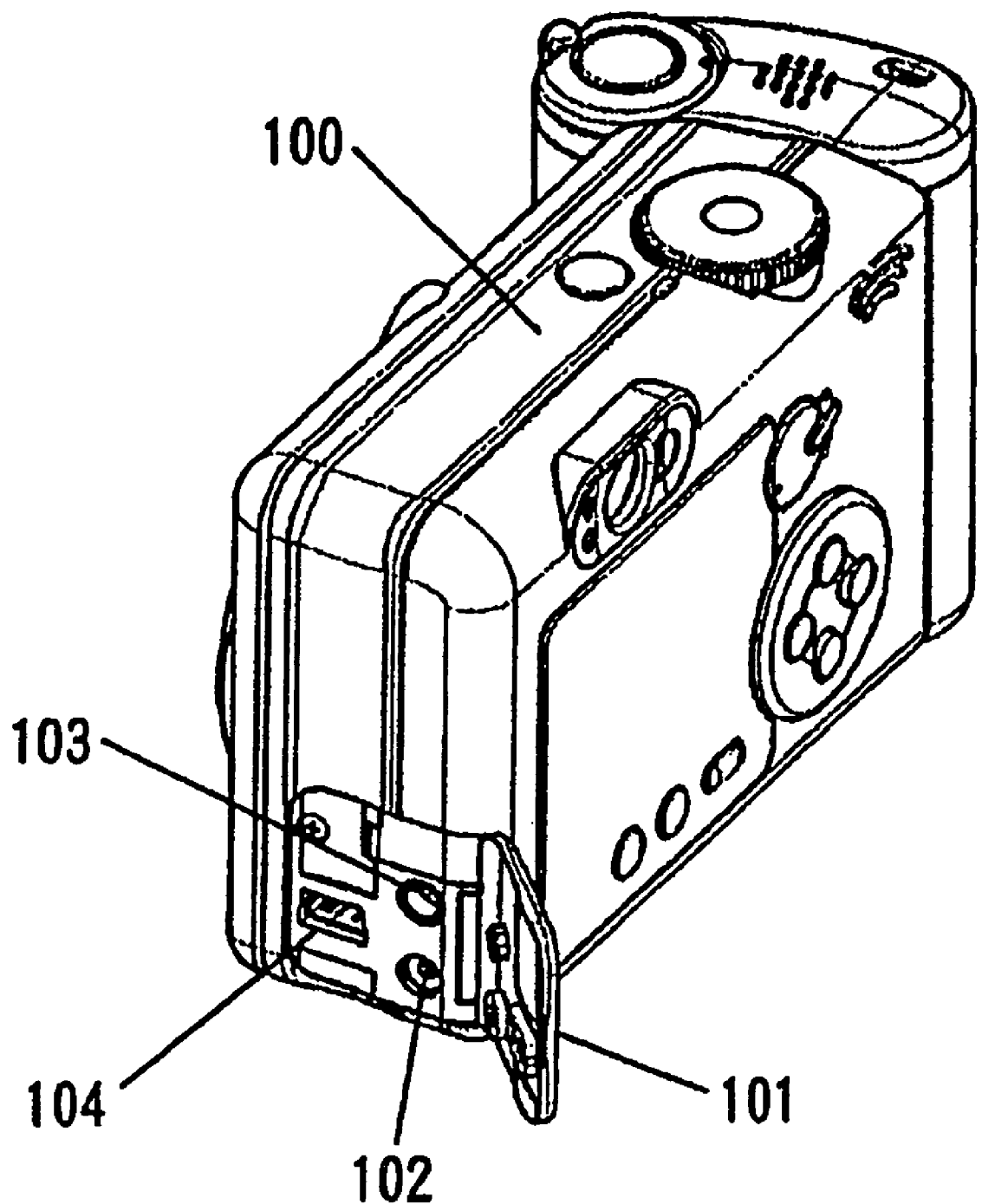
FIG. 14 is another rear perspective view of the conventional digital camera.
Figure 15:
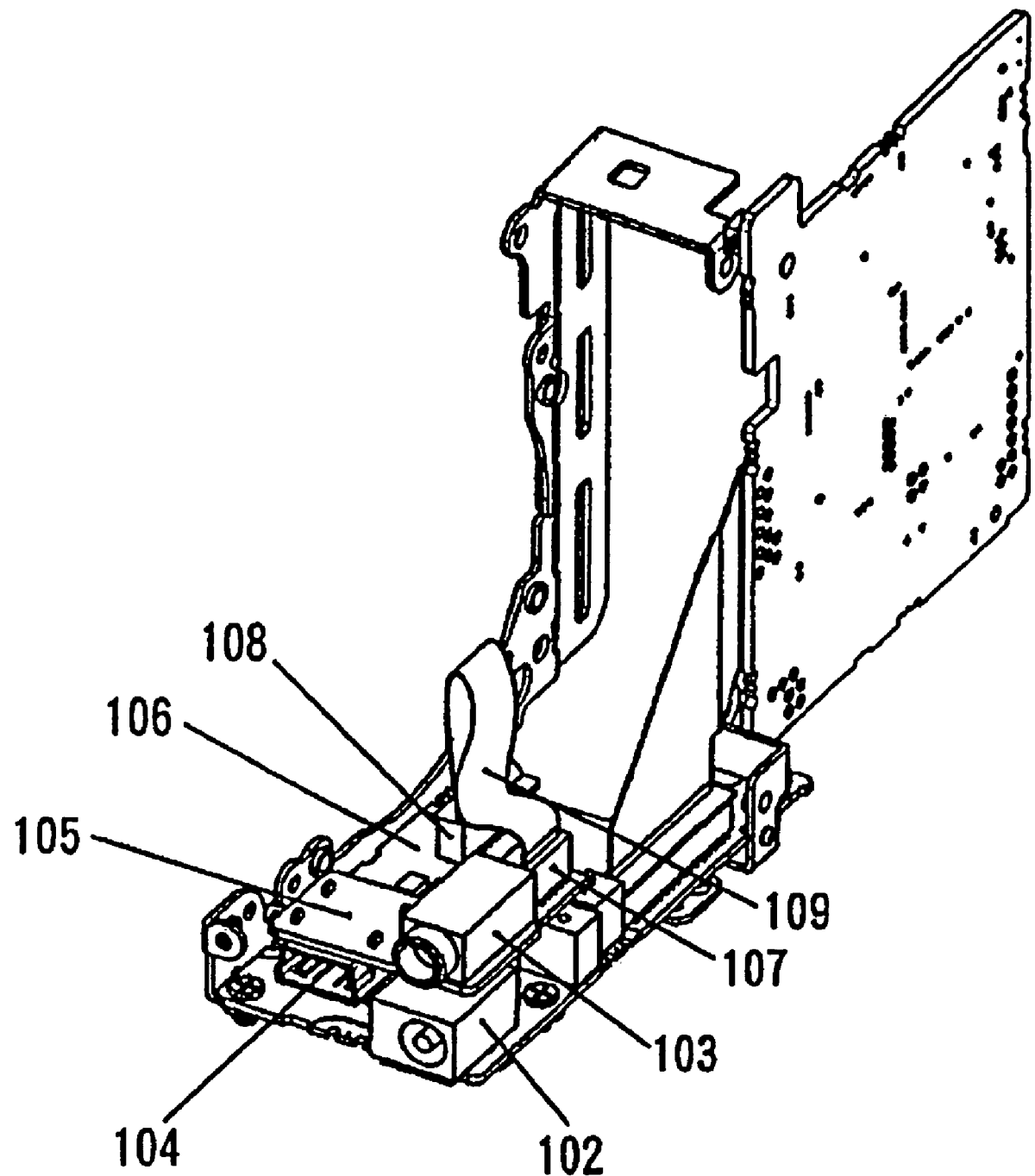
FIG. 15 is a view showing the internal structure of the conventional digital camera.

FIG. 11 and FIG. 12 respectively show the connector cover 9 and a rear cover 22 forming the rear face 1b of the camera body 1. A side cover 23 forming the side face 1a of the camera body 1 is fixed to the rear cover 22.

Figure 2:
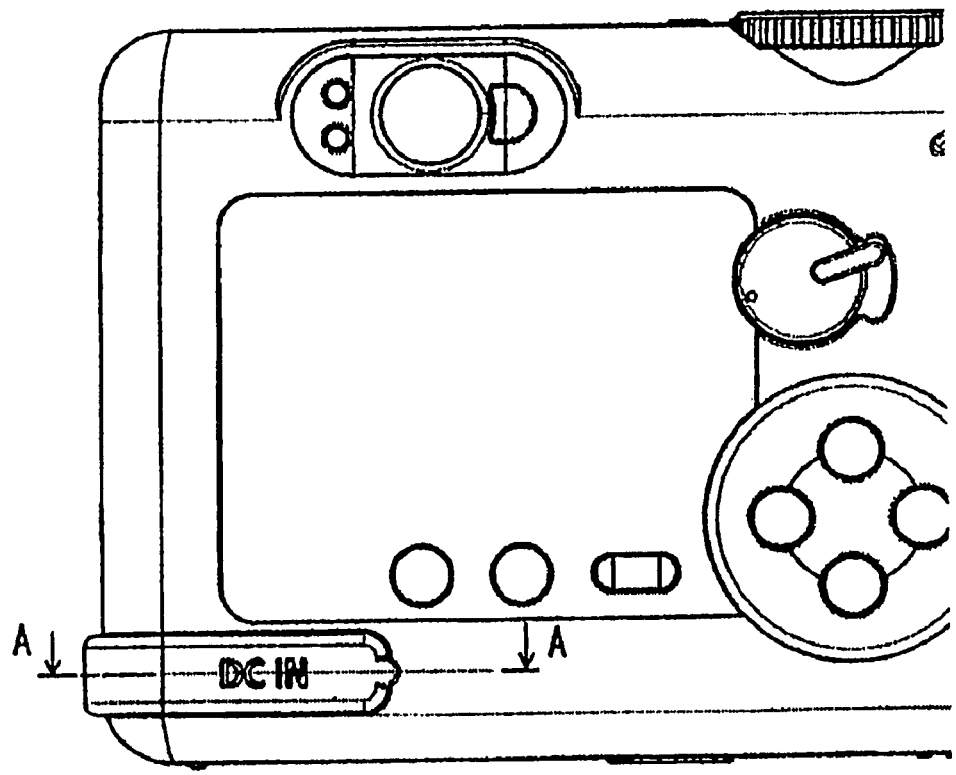
FIG. 2 is a rear view of the above-mentioned digital camera.
Figure 3:
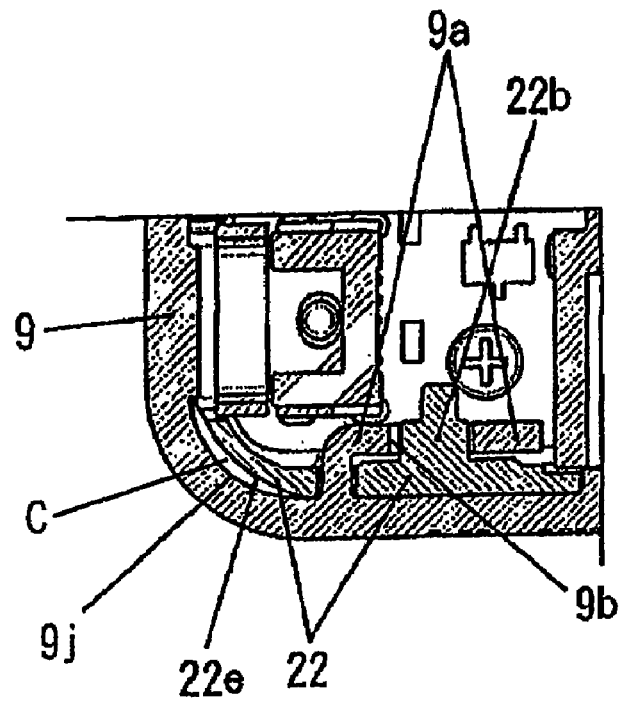
FIG. 3 is a magnified view of the portion B of FIG. 1.

FIG. 1 is a view of the camera shown in FIG. 2, cross-sectioned on line A-A and viewed from the arrow-indicated direction. FIG. 3 is a magnified view of the portion B of FIG. 1.

The connector cover 9 is integrally made of an elastic material, such as elastomer. The connector cover 9 has cover portions 9h and 9i on both sides in its longitudinal direction, and also has an installation piece 9a provided between these cover portions 9h and 9i so as to be installed to a boss portion 22b provided on the rear cover 22. The installation piece 9a extends in an L-shape as shown in FIG. 1 and FIG. 3 and has an opening portion 9b at its end. As shown in FIG. 1, the installation piece 9a is passed through a hole 22a formed in the rear cover 22 and inserted inside the rear cover 22, and the opening portion 9b is engaged with the boss portion 22b formed inside the rear cover 22, whereby the installation piece 9a is installed to the rear cover 22.

During the installation work, the installation piece 9a is deformed elastically and can be inserted into the hole 22a. After the installation work, however, the installation piece 9a returns to its original L-shape, whereby the engagement state of the opening portion 9b with the boss portion 22b is maintained. This engagement prevents the connector cover 9 from being detached from the rear cover 22 even if the connector cover 9 is pulled forcibly. FIG. 12 shows the state wherein the connector cover 9 is installed to the rear cover 22.

With this structure, the connector cover 9, a single member, can close a plug-insertion hole 22c (see FIG. 11) for the DC input connector 12 and a plug-insertion hole 22d for the USB connector 11, both formed in the rear cover 22, and a plug-insertion hole 23a for the audio/video output connector 10 formed in the side cover 23. In addition, regarding the installation of the connector cover 9 to the rear cover 22, the connector cover 9 can also have an easy-to-assemble shape without increasing the number of components.

It is necessary that the height of the boss portion 22b should be set sufficiently high so that the connector cover 9 does not come out and drop easily at the opening/closing time of the connector cover 9. For this purpose, the boss portion 22b (a structural part for installing the connector cover 9) is protruded into a space between the USB connector 11 and the DC input connector 12 in this embodiment, whereby the upsizing of the camera is prevented while the height of the boss portion 22b is maintained securely. In other words, in this embodiment, the connector cover 9 is installed to the rear cover 22 while the space between the USB connector 11 and the DC input connector 12 is used efficiently.

The relationship between the hole 22a of the rear cover 22 and the installation piece 9a of the connector cover 9 is loose since a slight play is provided therebetween to avoid a problem of thermal shrinkage described later.

In addition, as shown in FIG. 11 and FIG. 12, a projecting portion 9c having a dimension so as to be slightly press-fitted into the plug-insertion hole 22c is formed on the internal face of the cover portion 9h of the connector cover 9, and a projecting portion 9d having a dimension so as to be slightly press-fitted into the plug-connection port of the audio/video output connector 10 is formed on the internal face of the cover portion 9i of the connector cover 9. By slightly press-fitting these projecting portions 9c and 9d into the plug-insertion hole 22c and the plug-connection port of the audio/video output connector 10, respectively, the closed states of the cover portions 9h and 9i can be maintained.

Figure 4:
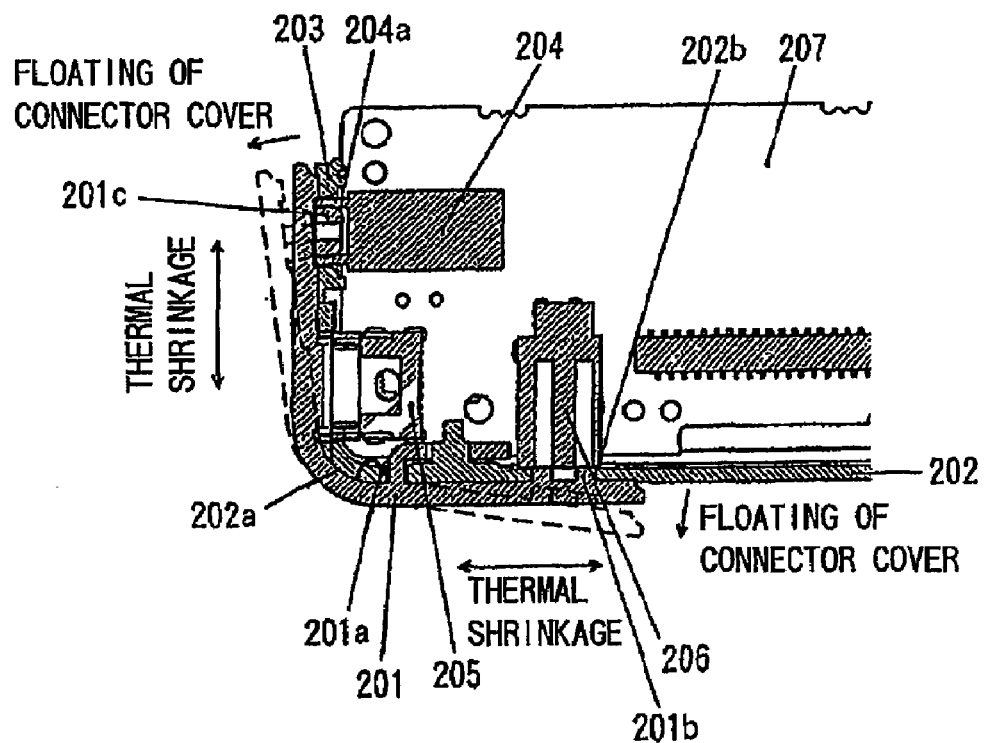
FIG. 4 is a view showing a connector cover during thermal shrinkage.

In the case where a connector cover 201 is disposed so as to stride over the two faces (the rear cover 202 and the side cover 203) of a camera body as shown in FIG. 4, a problem described below will occur. In FIG. 4, 204 to 206 are connectors which are the same as the present embodiment. More specifically, the thermal expansion coefficient of the elastic material, such as elastomer, of the connector cover 201 differs from that of the plastic material of the camera body (202 and 203). Hence, if a temperature change occurs, the connector cover 201 thermally shrinks more significantly than the camera body (202 and 203). If the external face 202a connecting the above-mentioned two faces of the camera body and the internal face 201a, opposed to the external face 202a, of the connector cover 201 have the same shape and make contact with each other, a force of lifting the cover portions of the connector cover 201 from the camera body is exerted, using the above-mentioned contact portion as a fulcrum. As a result, the projecting portion 201b of the connector cover 201 slightly press-fitted into the plug-insertion hole 202b of the rear cover 202 comes out therefrom, or the projecting portion 201c of the connector cover 201 slightly press-fitted into the plug-connection port 204a of the connector 204 comes out therefrom, whereby the connector cover 201 is opened.

In order that this problem can be avoided, in this embodiment, at the portion connecting the side face 1a to the rear face 1b of the camera body 1, that is, at the corner of the rear cover 22, wherein the rear cover 22 is connected to the side cover 23, and at the portion, opposed to the corner of the connector cover 9, the external face 22e of the rear cover 22 and the internal face 9j of the connector cover 9 are made different from each other in shape (more specifically, the curvature radius of the internal face 9j of the connector cover 9 is made smaller than that of the external face 22e of the rear cover 22)

as shown in FIG. 3. Hence, a clearance C is provided positively between these faces 22e and 9j. Even if thermal shrinkage caused in the connector cover 9 is larger than that caused in the rear cover 22 owing to a temperature change, a force of lifting the cover portions 9h and 9i of the connector cover 9 from the camera body 1 is hardly generated because of this clearance C. Therefore, the projecting portions 9c and 9d are prevented from coming out from the plug insertion hole 22c and the plug-connection port of the audio/video output connector 10, respectively. In other words, the closed state of the connector cover 9 can be maintained.

Hence, the cover portions 9h and 9i of the connector cover 9 installed to the rear cover 22 can be independently opened and closed owing to elastic deformation, using a portion near the root portion of the installation piece 9a which is, the installation portion of the connector cover 9 to the rear cover 22 (a portion intersecting with the rear cover 22), as a fulcrum 9g as shown in FIG. 1. In this embodiment, the above-mentioned projecting portions 9c and 9d are disposed sufficiently away from the fulcrum 9g of the opening/closing deformation of the connector cover 9, whereby the opening/closing deformation of one of the cover portions 9h and 9i does not adversely affect the other cover portion.

In addition, the connector cover 9 is disposed so as to stride over the two faces (the rear cover 22 and the side cover 23) of the camera body 1 in this embodiment, whereby it is possible to provide a function of protecting the portion (corner) connecting the above-mentioned two faces.

In this embodiment, the digital camera provided with the DC input connector, the USB connector and the audio/video output connector has been described. However, the present invention can also be applied to digital cameras, camcorders and other electronic apparatuses, such as handheld devices, provided with connectors other than these connectors.

Furthermore, it is not necessary that the connector cover should be entirely made of an elastic material just as in the case of this embodiment. The connector cover may be made of a combination of an elastic material and a plastic material, a combination of an elastic material and metals, etc., by using various methods, such as multicolor forming, bonding, thermal welding and insert molding.

Still further, as to the method of installing the connector cover to the camera body, methods other than that described in the above-mentioned embodiment may be adopted. For example, a method of elastically engaging an arrowhead-shaped boss formed on the connector cover with a hole formed in the camera body can be used. Furthermore, various methods, such as bonding, thermal welding and fixing using an E-ring or the like, can also be used.

As described above, according to the above-mentioned embodiment, the USB connector and the DC output connector can be arranged efficiently in the area near the corner formed by the first and second faces of the apparatus body while the plugs are allowed to be connected easily thereto. In addition, the number of components can be decreased. Hence, the apparatus body can be miniaturized, and an electronic apparatus (for example, a camera) having excellent handling performance can be attained.

By making the length of the USB connector in its connection direction shorter than that of the DC input connector, other electronic components and structural parts (for example, a structural part for installing the connector cover member to the apparatus body) of the electronic apparatus can be disposed in the space between the end face of the USB connector in its connection direction and the DC input connector. Hence, the entire arrangement efficiency of the arrangement of the components including the above-mentioned other electronic components and structural parts can be improved.

In addition, the third connector having a connection port on the first face, whose length in its connection direction is longer than that of the USB connector, is provided, and the USB connector is disposed in the area enclosed by the DC input connector and the audio/video output connector and the first and second faces. Hence, the USB connector having a short length and the DC input connector and the audio/video output connector having long lengths can be arranged efficiently.

Furthermore, the cover member formed integrally for opening/closing the connection ports of the respective connectors is provided and installed to the apparatus body at the installation portion between the connection ports of the USB connector and the DC input connector. Still further, the cover member is made deformable elastically so as to independently open and close the connection ports of the USB connector and the DC input connector, using the installation portion as a fulcrum. Hence, only the cover portion for the connector to be used can be opened by using this simple structure. Moreover, the cover member being superior in design and having a function of protecting the portion (corner or curved portion) connecting the first and second faces can be provided for the electronic apparatus.

Furthermore, the USB connector is disposed in the area between the first face and the DC input connector, and the structural part for installing the cover member to the apparatus body is protruded between the USB connector and the DC input connector. Hence, the space between the USB connector and the DC input connector can be used efficiently. This is effective in miniaturizing the apparatus.

Still further, the shape of the external face of the portion connecting the first face and the second face of the apparatus body is made different from the shape of the internal face, covering the connecting portion, of the cover member. Hence, the floating and detachment of the cover member owing to the difference between the thermal deformation amount of the apparatus body and that of the material of the cover member can be prevented.

While preferred embodiment has been described, it is to be understood that modification and variation of the present invention may be made without departing from the scope of the following claims.

This application claims priority from Japanese Patent Application No. 2003-296188 filed on Aug. 20, 2003, which is hereby incorporated by reference herein.

What is claimed is:

1. An electronic apparatus comprising:
an outer member which includes a first face and a second face perpendicular to the first face;
a first connector which has a connection port exposed on the first face of the outer member;
a second connector which has a connection port exposed on the second face of the outer member;
a third connector which has a connection port exposed on the first face of the outer member, the length of the third connector in a connection direction thereof being shorter than that of the first connector;
one board on which the first, second and third connectors are mounted; and
a cover member which is adapted to open and close the connection ports of the first, second and third connectors, wherein the first connector extends in a direction substantially parallel to the second face of the outer member and the second connector extends in a direction substantially parallel to the first face of the outer member;

wherein the third connector is disposed in an area surrounded by the first and second faces and the first and second connectors;

wherein the outer member has a projection portion which protrudes toward the inside of the electronic apparatus and is positioned between the second and third connectors in a plane including the second and third connectors; and wherein the cover member has an installation portion passing through the outer member and engaging with the projection portion.

2. The electronic apparatus according to claim 1, wherein the outer member has a connecting portion through which the first and second faces are connected, and the cover member has a covering portion which covers the connecting portion; and wherein the curvature radius of an internal face of the covering portion is smaller than that of an external face of the connecting portion.

* * * * *